June 14, 1932. F. KESSLER ET AL 1,863,376
MOUNTING ARRANGEMENT FOR ELECTRICAL APPARATUS
Filed April 22, 1929
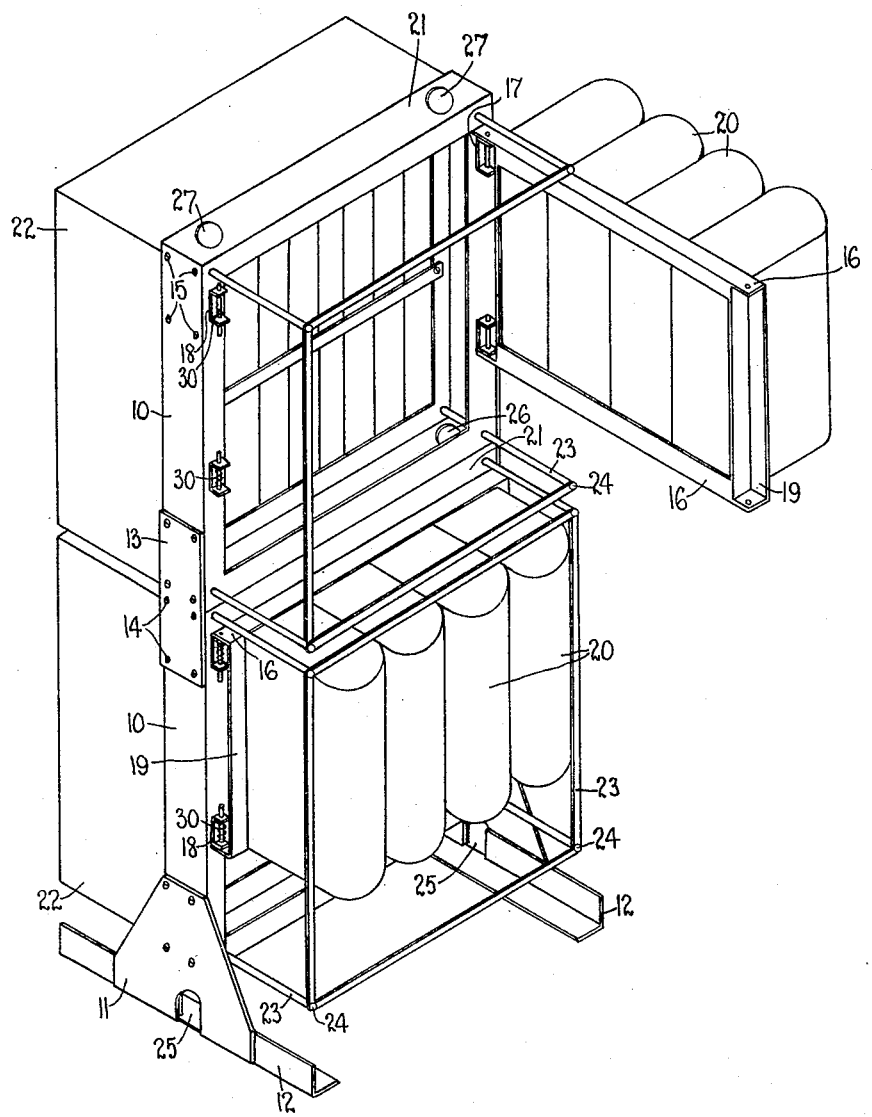
Inventors
Frank Kessler
Cecil Robert Woodland
R. E. Richardson Atty.

Patented June 14, 1932

1,863,376

UNITED STATES PATENT OFFICE

FRANK KESSLER AND CECIL ROBERT WOODLAND, OF LIVERPOOL, ENGLAND, ASSIGNORS TO ASSOCIATED TELEPHONE AND TELEGRAPH COMPANY, OF CHICAGO, ILLINOIS, A CORPORATION OF DELAWARE

MOUNTING ARRANGEMENT FOR ELECTRICAL APPARATUS

Application filed April 22, 1929, Serial No. 356,975, and in Great Britain June 12, 1928.

This invention relates to improvements in frameworks for carrying electrical equipment and is particularly applicable to the support and mounting of apparatus as used in telephone systems.

In many telephone exchanges the exact amount of expansion or growth which may be necessary to meet future requirements cannot be readily gauged at the time of the original installation and it is not an economic proposition to initially instal more framework and supports than is necessary to allow more than a reasonable amount of expansion. According to one feature of the present invention, therefore, the framework is made in sections of similar construction, so that when it is desired to extend the amount of equipment in service further sections may be added, mounted above those already in use, somewhat after the manner of a so-called expanding book-case. In this connection it may be pointed out that these sections are most readily mounted in a vertical direction and this permits considerable extension without involving additional floor space. Furthermore, these framework units may be made so that they are readily adaptable to standard types of apparatus and this arrangement conveniently lends itself to a self contained method which is particularly advantageous in telephone exchanges, where for instance, a framework unit may be arranged to carry complete equipment for a definite number of lines and the capacity of the exchange can be increased by merely adding further units as required.

A further feature of the invention lies in the dimensional layout, the length and height of each frame unit having been made the same and thus forming a unit of square appearance. This permits any of the cover supporting members to be turned out of place and laid against the corresponding member to facilitate access to the equipment or removal of a shelf without the inconvenience of one of such members sticking out as happens with a rectangular form wherein one dimension is longer than the other.

A framework made according to the present invention is of simple construction and is not costly to manufacture.

In order that the invention may be better understood a detailed description of one form of construction will now be given, reference being had to the attached drawing. It will be understood that this form is typical and given by way of example only and that various detail modifications may be made in the construction without departing from the scope of the invention.

Referring now to the drawing, in which an assembly comprising two sections or frame units is shown, it will be seen that the construction consists mainly of vertical members 10 of channel section closed by upper members 21 and carried by triangular shaped members 11 to suitably shaped feet or supports 12 which may be provided with holes for fixing to the floor. The two sections which make up the framework shown are secured together by means of the plate 13 and bolts 14, and fixing holes 15 will be seen at the upper end of the upper unit so that further units may be secured by similar plates in the same manner. Assuming for the sake of example that the equipment shown is intended for use with telephone equipment, for instance, a private automatic exchange, each frame unit is conveniently made self contained, that is, it is arranged to carry equipment for say 25 lines, and therefore in the drawing equipment is shown for 50 lines. Alternatively, of course, in a large exchange additional equipment associated with the system may be carried on the framework, the design of which permits standard equipment to be readily mounted on either side of the frame and thus extensions may be readily added as desired.

One side of the rack may be fitted with angle iron members 16 supported on hinges 17 and held in position by similar pin and socket members 18 so that if desired the shelf strengthened by the end members 19 may be swung outwards and easy access to the rear of the switch and wiring is obtained. The holding pins 18 are held in position by spiral springs 30 but the hinges consist of plain pin and socket members. This arrangement permits the shelf to be arranged to swing to either side as may be found necessary by local conditions. The pins 18 would be changed over with the pins in the hinges 17, thus permitting the removal spring held pins to be on the right and the shelf would then swing on the left hand hinges. This arrangement is usually effected of course before the wiring is completed.

In the drawing the lower unit is shown with the shelf in closed position against the frame and the upper unit is shown with the shelf swung open. On the front portion of the framework telephone equipment such as, for example, selectors, final selectors or relay groups may be mounted and secured on relay bases to the shelf member 16 in substantially known manner, and fitted with covers 20.

The rear portion of the frame may be similarly fitted with angle members and hinges, or such other type of mounting for supporting apparatus as may be required by the exchange considerations, for example, subscriber's line relay equipment, together with rotary line switches or line finders. The whole equipment on each side of each frame unit is enclosed by complete covers 22 which may be of metal, or if desired of a transparent material such as celluloid; these are shown in place on the rear of the frame but are removed on the front so that the cover supporting members 23 may be seen. To facilitate removal of one of these members when it is desired to swing a shelf open, milled finger units 24 which may take the form of terminal nuts arranged to screw on to a suitable thread at the ends of the four horizontal pillars so that the connecting members 23 may be removed without the use of a screw driver or like tool may be employed to hold the cover supporting members in position. Moreover, since the vertical and horizontal dimensions are equal the cover supporting members may be deflected through a right angle and laid against each other. For instance, the upper right hand vertical member, which is removed to allow the shelf to swing open to the position shown may be turned about its upper nut and lie along the uppermost horizontal member. If desired, it may be left in this position permanently and the cover replaced. There is thus no inconvenience caused by the removal of the member or its sticking out and it is also kept on the framework so that it cannot get lost. The method of addition or extension to the existing equipment will now be readily apparent—it is simply necessary to add further units similar to those shown and bolted to them by means of a plate 13 in the manner already described. The installation can thus be extended or added at will.

To facilitate incoming cabling a hole 25 is left in the triangular member 11 and foot or support 12 so that the cables may be conveniently taken to the rear of the individual switch or relay groups, while holes 26 are left in the top and bottom members of the frame so that the cabling to the upper units may be carried up the vertical channel members 10. These holes in the uppermost member 21 are fitted with a removable wood plug 27 to prevent the ingress of dust and like foreign matter, and also to finish the appearance of the framework, and avoid the unsightly hole which would otherwise be left in the top of the framework.

What we claim as new and desire to secure by Letters Patent is:—

1. A framework comprising a plurality of independent sections adapted to be mounted one on top of another, a hinged-apparatus mounting shelf on the face of each section, a cover support comprising horizontally and vertically-disposed members removably attached to the face of each section, and means for releasing a vertically-disposed element without detaching the same so that it may be deflected to permit the shelf to swing open.

2. A framework comprising a plurality of independent sections adapted to be mounted one on top of another, a hinged-apparatus mounting shelf on the face of each section, a cover support comprising horizontally and vertically-disposed members of equal length removably attached to the face of each section, and means for releasing a vertically-disposed member without detaching the same whereby the member can be deflected so as to lie parallel with the adjacent horizontally-disposed member without projecting beyond said member.

3. A framework comprising a plurality of independent sections, apparatus mounting shelves on each section, correspondingly-spaced holes at the top and bottom of the lateral members of each section, flat clamping plates adapted to be attached to adjacent sections by means of said holes for assembling a plurality of sections into a single unit, and base plates adapted to be attached to the lowermost section by means of said holes to support the complete assembly.

4. A frame work comprising a plurality of independent sections adapted to be mounted one on top of another, apparatus mounting shelves on each section, correspondingly-spaced holes at the top and bottom of the lateral members of each section for rigidly fastening adjacent sections together, and correspondingly-spaced holes in the cross members of each section through which a cable may be extended to electrically connect the various sections.

5. A framework comprising a plurality of independent sections adapted to be mounted one on top of another, a pair of similar lugs on each side of the face of a section, an equipment mounting shelf supported by said lugs, pins attaching the shelf to one of said pairs of lugs and adapted to serve as pivots for the shelf, and pins attaching the shelf to the other pair of lugs and adapted to lock the shelf in position.

6. A framework comprising a plurality of independent sections adapted to be mounted one on top of another, a pair of similar lugs on each side of the face of each section, an equipment supporting shelf, pins adapted to attach the shelf to either pair of lugs whereon the shelf can swing with the associated lugs as the pivotal point, and spring-equipped pins adapted to lock the shelf in position to the other pair of lugs.

7. A sectional supporting rack for automatic telephone switching apparatus comprising a plurality of similar independent sections mounted one above another and rigidly joined together, supporting elements on the front and rear of each section, and apparatus shelves pivotally mounted on said elements.

8. A sectional supporting rack for automatic telephone switching apparatus of which each section comprises a rectangular metal frame, apparatus supporting elements on each frame, and means at the top and bottom of each frame for rigidly joining the frame of adjacent sections.

9. A sectional supporting rack for automatic telephone switching apparatus comprising a plurality of similar independent sections mounted one above another and joined together to form a rigid unit, switching apparatus mounted on the front and rear of each section, and means whereby the apparatus of the various sections may be electrically interconnected.

10. In an automatic telephone system, a switchboard comprising a plurality of similar independent sections of framework joined together to form a rigid unit, apparatus supporting shelves mounted on each section, switching apparatus mounted on said shelves, and means for interconnecting the switching apparatus of the various sections to form a unitary telephone system.

11. A sectional rack comprising a plurality of similar independent sections each consisting of a rectangular metal frame upon which are mounted hinged apparatus supporting shelves and cover supporting members, a base member, and means for assembling the base member and said frames into a rigid vertical unit.

In testimony whereof we have signed our names at Liverpool, England, this 3rd day of April 1929.

FRANK KESSLER.
CECIL ROBERT WOODLAND.